United States Patent
Koga et al.

(10) Patent No.: US 9,566,956 B2
(45) Date of Patent: Feb. 14, 2017

(54) ELECTRIC PARKING BRAKE DEVICE

(71) Applicants: Keiichi Koga, Chiryu (JP); Jin Yamada, Anjo (JP); Yoshikazu Tachiiri, Chiryu (JP); Keiichi Shino, Tokai (JP)

(72) Inventors: Keiichi Koga, Chiryu (JP); Jin Yamada, Anjo (JP); Yoshikazu Tachiiri, Chiryu (JP); Keiichi Shino, Tokai (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/907,105

(22) PCT Filed: Jul. 23, 2014

(86) PCT No.: PCT/JP2014/069400
§ 371 (c)(1),
(2) Date: Jan. 22, 2016

(87) PCT Pub. No.: WO2015/012295
PCT Pub. Date: Jan. 29, 2015

(65) Prior Publication Data
US 2016/0152214 A1    Jun. 2, 2016

(30) Foreign Application Priority Data
Jul. 24, 2013 (JP) .................... 2013-153377

(51) Int. Cl.
F16D 65/22    (2006.01)
B60T 1/06    (2006.01)
(Continued)

(52) U.S. Cl.
CPC ............... *B60T 1/067* (2013.01); *F16D 51/20* (2013.01); *F16D 65/09* (2013.01); *F16D 65/22* (2013.01);
(Continued)

(58) Field of Classification Search
CPC .......... F16D 51/00; F16D 51/18; F16D 65/22; F16D 65/58; B60T 7/102; B60T 7/104
(Continued)

(56) References Cited

U.S. PATENT DOCUMENTS 3,134,463 A * 5/1964 Birge .................. F16D 51/18
188/138
3,835,964 A * 9/1974 Margetts ............. F16D 65/58
188/196 BA
(Continued)

FOREIGN PATENT DOCUMENTS

JP    61-097638 U    6/1986
JP    3-025032 U    3/1991
(Continued)

OTHER PUBLICATIONS

International Search Report (PCT/ISA/210) issued on Sep. 9, 2014, by the Japanese Patent Office as the International Searching Authority for International Application No. PCT/JP2014/069400.
(Continued)

*Primary Examiner* — Christopher Schwartz
(74) *Attorney, Agent, or Firm* — Buchanan Ingersoll & Rooney PC

(57) ABSTRACT

At the connection region (connection mechanism of a parking lever and an electric actuator, a first connection pin is fitted in the end of a shaft member, is orthogonal to the shaft member, and is disposed parallel to the support shaft of the parking lever. A second connection pin is fitted in the swinging end of the parking lever and is parallel to the first
(Continued)

connection pin. A connection member is rotatable with respect to the end of the shaft member in the circumferential direction of the first connection pin at a first hole where the connection member is fitted on the first connection pin, is rotatable with respect to the parking lever in the circumferential direction of the second connection pin at a second hole where the connection member is fitted on the second connection pin, and connects the two pins.

4 Claims, 3 Drawing Sheets

(51) Int. Cl.
  *F16D 65/09* (2006.01)
  *F16D 51/20* (2006.01)
  *F16D 123/00* (2012.01)
  *F16D 125/64* (2012.01)
(52) U.S. Cl.
  CPC ....... *F16D 2123/00* (2013.01); *F16D 2125/64* (2013.01)
(58) Field of Classification Search
  USPC ...... 188/2 D, 106 A, 106 P, 196 B, 324, 325
  See application file for complete search history.

(56) References Cited

U.S. PATENT DOCUMENTS

| | | | |
|---|---|---|---|
| 5,092,428 | A | 3/1992 | Kobayashi et al. |
| 6,405,838 | B1 | 6/2002 | Shaw |
| 6,581,729 | B1* | 6/2003 | Moriwaki ................. F16C 1/12 188/106 A |
| 2004/0251100 | A1* | 12/2004 | Maehara ................. F16D 65/22 188/324 |
| 2016/0107622 | A1* | 4/2016 | Rizzini .................... G05G 1/04 74/523 |

FOREIGN PATENT DOCUMENTS

| | | |
|---|---|---|
| JP | 2010-181001 A | 8/2010 |
| JP | 2012-049174 A | 3/2012 |
| JP | 2012-246960 A | 12/2012 |

OTHER PUBLICATIONS

Written Opinion (PCT/ISA/237) issued on Sep. 9, 2014, by the Japanese Patent Office as the International Searching Authority for International Application No. PCT/JP2014/069400.

* cited by examiner

ELECTRIC PARKING BRAKE DEVICE

TECHNICAL FIELD

The present invention relates to an electric parking brake device, and in particular, an electric parking brake device configured to move a parking lever in a drum brake from a return position to an actuating position by forward driving of an electric actuator, moving a brake shoe from the return position to the actuating position, and to move the parking lever from the actuating position to the return position by backward driving of the electric actuator, moving the brake shoe from the actuating position to the return position.

BACKGROUND ART

This type of electric parking brake device is described in, for example, Japanese Unexamined Patent Application Publication No. 2012-246960, and the electric actuator includes am electric motor capable of rotating forward and backward, a conversion mechanism capable of converting rotational motion of the electric motor into linear motion of a shaft member (screw shaft), and a connection mechanism that connects an end of the shaft member to a swinging end of the parking lever. In this type of electric parking brake device, the parking brake switch can be operated to rotate the electric actuator forward, thereby moving the parking lever from the return position to the actuating position (that is, a parking brake is activated). Further, the parking brake switch can be released to rotate the electric actuator backward, thereby moving the parking lever from the actuating position to the return position (that is, the parking brake is released (inactivated)).

SUMMARY OF INVENTION

In the electric parking brake device described in Japanese Unexamined Patent Application Publication No. 2012-246960, a connection mechanism that connects the end of the shaft member to the swinging end of the parking lever has a connection structure in which a flat portion and a convex portion at the end of the shaft member engage with a flat rotation restricting portion at the swinging end of the parking lever. Although the above connection structure is simple and inexpensive, reduction of driving force and noise generation can occur due to sliding friction on the engagement region between the flat portion at the end of the shaft member and the flat rotation restricting portion at the swinging end of the parking lever. Further, with the above connection structure, stress concentration due to line contact can occur at a driving-force transmission portion (engagement portion between the convex portion at the end of the shaft member and the flat rotation restricting portion at the swinging end of the parking lever).

The present invention is devised to solve the above problems, and is characterized in that the connection mechanism includes a first connection pin that is fitted in an end of the shaft member, is orthogonal to the shaft member, and is disposed parallel to a support shaft of the parking lever, a second connection pin that is fitted in a swinging end of the parking lever and is disposed parallel to the first connection pin, and a connection member that is rotatable with respect to an end of the shaft member in a circumferential direction of the first connection pin at a first hole where the connection member is fitted on the first connection pin, is rotatable with respect to the parking lever in a circumferential direction of the second connection pin at a second hole where the connection member is fitted on the second connection pin, and connects the first connection pin to the second connection pin.

In the electric parking brake device according to the present invention, the connection mechanism that connects the end of the shaft member to the swinging end of the parking lever includes the first connection pin, the second connection pin, and the connection member, and movement (swinging about the support shaft) of the parking lever with respect to the linearly-moving shaft member is allowed by rotational motion about the first connection pin and the second connection pin of the connection member. Therefore, problems associated with the connection structure of the conventional art (reduction of driving force, noise generation, stress concentration due to line contact, and the like) can be all resolved.

In implementing the present invention, the first hole or the second hole of the connection member may be an elliptical hole extending in the moving direction of the connection member. In this case, size variation of components and movement of the connection member at service braking of the drum brake can be absorbed by movement of the first connection pin in the elliptical first hole or movement of the second connection pin in the elliptical second hole.

In implementing the present invention, when the shaft member moves to the return position, the first connection pin can contact a bracket that supports the electric actuator. In this case, the first connection pin contacts the bracket, stopping the shaft member at the return position. Thus, the parking lever connected to the end of the shaft member via the connection mechanism can be also stopped, restricting unnecessary movement of the shaft member, the parking lever, and so on.

DESCRIPTION OF EMBODIMENTS

Figure 1:
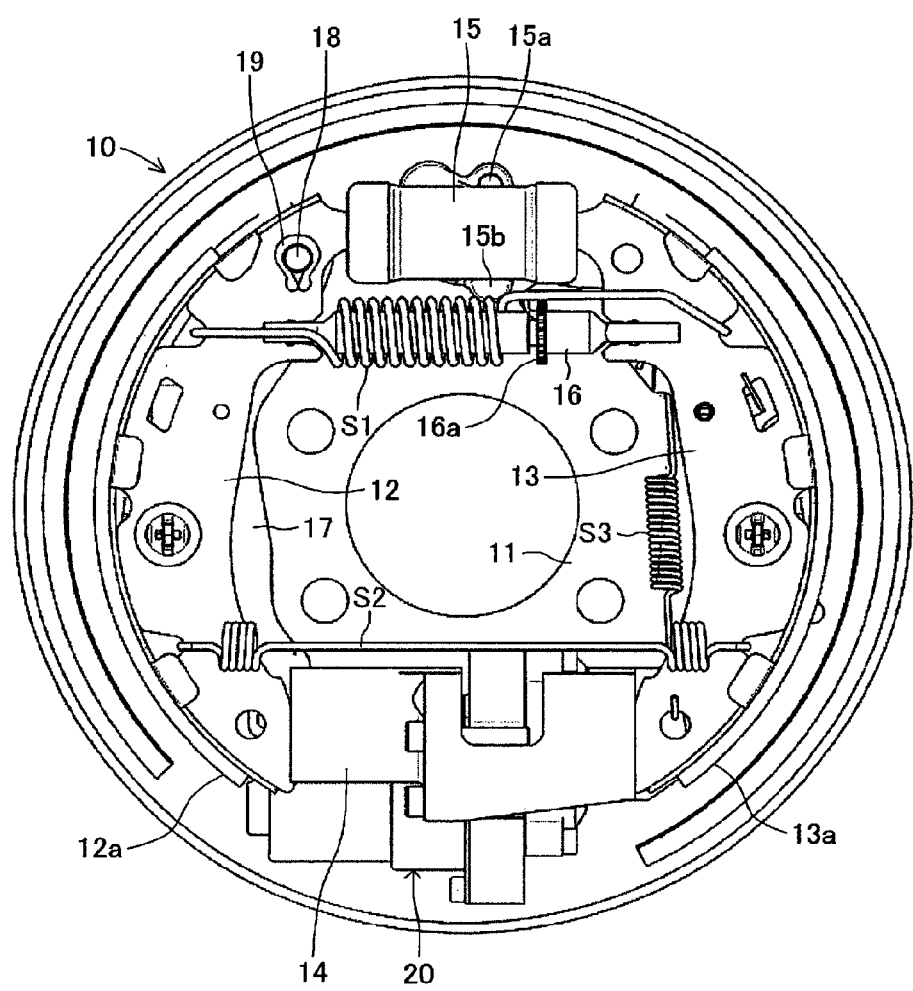
FIG. 1 is a front view illustrating an embodiment of an electric parking brake device according to the present invention.
Figure 2:
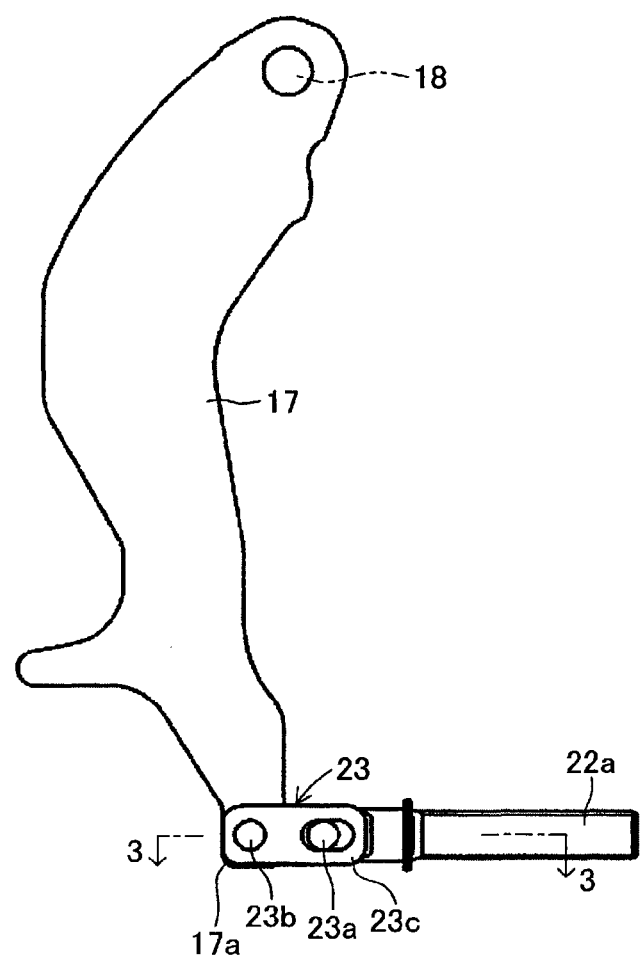
FIG. 2 is a front view illustrating a shaft member (screw shaft) as a component of an electric actuator, a parking lever, and a connection mechanism that connects the shaft member to the parking lever in the electric parking brake device in FIG. 1.
Figure 3:
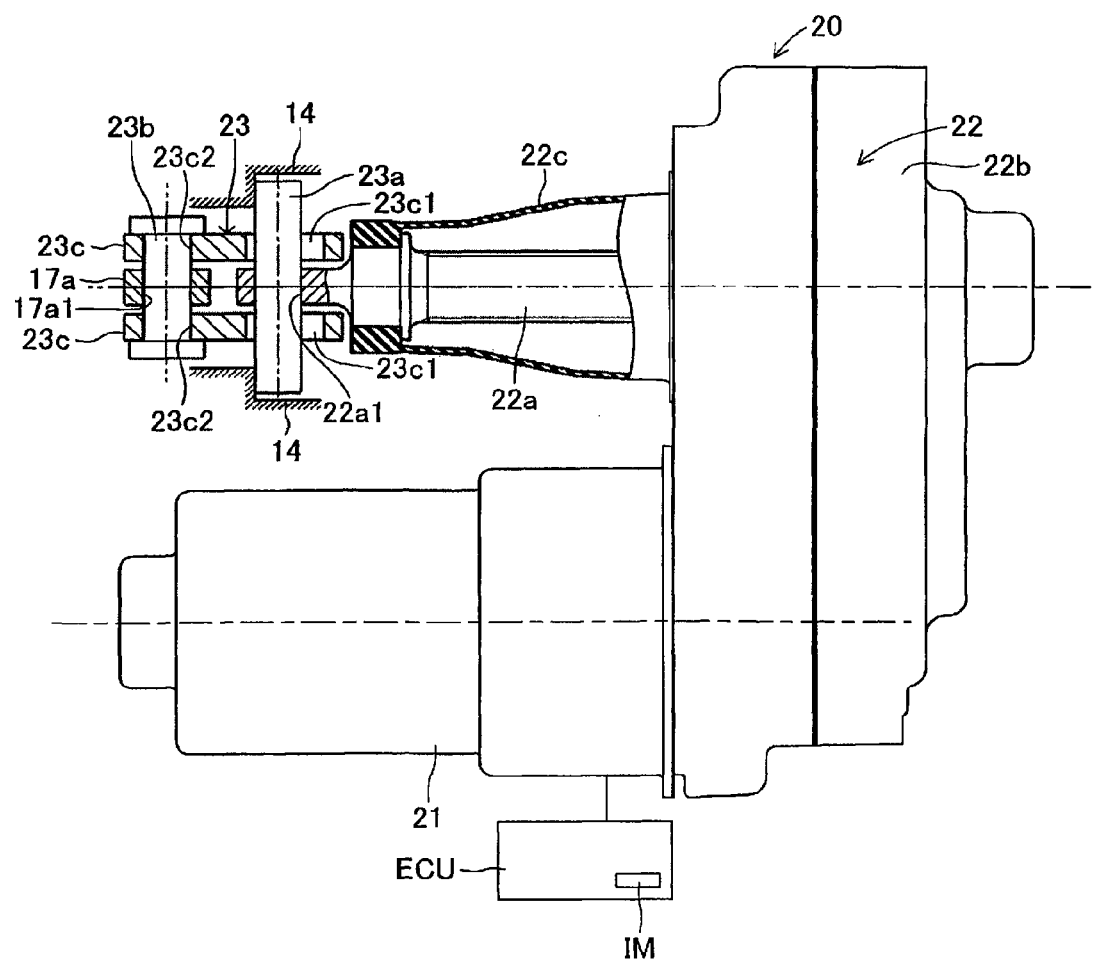
FIG. 3 is a sectional view taken along a line 3-3 in FIG. 2, and a front view of main structure of the electric actuator in FIG. 1 (an electric motor capable of rotating forward and backward and a conversion mechanism capable of converting rotational motion of the electric motor into linear motion of the shaft member).

An embodiment of the present invention will be described below with reference to figures. FIG. 1 to FIG. 3 illustrate an embodiment of an electric parking brake device according to the present invention, and the electric parking brake device in this embodiment includes a drum brake 10 equipped with a parking brake mechanism, and an electric actuator 20 for driving the parking brake mechanism.

As illustrated in FIG. 1, the drum brake 10 includes a disc-like back plate 11, and a pair of brake shoes 12, 13, an anchor block 14, and a wheel cylinder 15, which are fitted on the back plate 11. The back plate 11 is fixed to a mounting part (not illustrated) of a car body.

The brake shoes 12, 13 are fitted on the back plate 11 to be movable in a particular direction (direction along a plate face), and integrally include arcuate linings 12a, 13a pressed onto a brake drum (not illustrated) at braking. A connecting rod 16 with an adjusting mechanism and return springs S1, S2 are fitted between the brake shoes 12, 13.

The left brake shoe 12 in FIG. 1 engages with a left piston (not illustrated) of the wheel cylinder 15 at its upper end, engages with the anchor block 14 at its lower end, and is pressed leftward toward the brake drum (not illustrated) at braking. A parking lever 17 is swingably fitted on the brake shoe 12.

The right brake shoe 13 in FIG. 1 engages with a right piston (not illustrated) of the wheel cylinder 15 at its upper end, engages with the anchor block 14 at its lower end, and is pressed rightward toward the brake drum (not illustrated) at braking. A return spring S3 is fitted on the brake shoe 13 (the spring S3 is locked on the back plate 11 at its upper end, and is locked on the brake shoe 13 at its lower end).

The anchor block 14 is fixed to a lower portion of the back plate 11 in this figure by means of a fixture (not illustrated). The wheel cylinder 15 is fixed to an upper portion of the back plate 11 in this figure by means of a pair of fixtures 15a, 15b. The wheel cylinder 15 houses a pair of left and right pistons (not illustrated) that laterally separate from each other at braking (service braking) to laterally extend the left and right brake shoes 12, 13.

The connecting rod 16 tiltably engages with an upper portion of the brake shoe 12 and an upper portion of the parking lever 17 at its left end, and tiltably engages with an upper portion of the brake shoe 13 at its right end. The connecting rod 16 can be automatically adjusted (increased) in length by using a well-known adjusting mechanism 16a according to the wear volume of the linings 12a, 13a.

The parking lever 17 is disposed along the left brake shoe 12 in FIG. 1, and is swingably connected to the brake shoe 12 (is rotatable about a support shaft 18) at its upper end by means of the support shaft 18 and a clip 19. As illustrated in FIG. 2 and FIG. 3, the parking lever 17 is coupled to an end of a screw shaft 22a of the electric actuator 20 at its lower end (swinging end 17a) via a connection mechanism 23, and is laterally driven using the screw shaft 22a (is rotated about the support shaft 18).

As illustrated in FIG. 1, the electric actuator 20 is provided in the drum brake 10 and is fitted on and supported by the anchor block 14. As illustrated in FIG. 3, the electric actuator 20 includes an electric motor 21, a conversion mechanism 22, and a connection mechanism 23. The electric motor 21 can be rotated forward and backward, and is controlled to operate according to a current value corresponding to a rotational load by use of a motor control means (electric control unit) ECU. The current value corresponding to the rotational load can be detected using a current monitor IM of the motor control means (electric control unit) ECU.

The conversion mechanism 22 can convert rotational motion of the electric motor 21 into linear motion of the screw shaft 22a (swinging of the parking lever 17) so as to axially move the screw shaft 22a from a return position (position in FIG. 3) to an actuating position (position shifted rightward from the position in FIG. 3 by a predetermined distance) at forward driving when the electric motor 21 rotates forward, and to axially move the screw shaft 22a from the actuating position to the return position at backward driving when the electric motor 21 rotates backward.

The conversion mechanism 22 includes the screw shaft 22a, a nut (not illustrated) that is screwed with a threaded part of the screw shaft 22a, is rotatably provided in a housing 22b, and can be axially moved by a predetermined distance, and a reduction gear (not illustrated) that is provided between an output gear of the nut and an output shaft (not illustrated) of the electric motor 21 to reduce output of the electric motor 21 and transmits the output to the nut. The threaded part of the screw shaft 22a is coated and protected with a boot 22c provided between a front end of the screw shaft 22a and the housing 22b.

As illustrated in FIG. 2 and FIG. 3, the connection mechanism 23 includes a first connection pin 23a, a second connection pin 23b, and a pair of connection plates (connection member) 23c. The first connection pin 23a is fitted in a front end (end) of the screw shaft 22a, is orthogonal to the screw shaft 22a, and is disposed parallel to the support shaft 18 of the parking lever 17. An intermediate portion of the first connection pin 23a is integrally fitted into an attachment hole 22a1 in the front end (end) of the screw shaft 22a. Both ends of the first connection pin 23a are fitted in respective elliptical first holes 23c1 of the connection plates 23c to be relatively rotatable and movable in the major axis direction (lateral direction in FIG. 2 and FIG. 3). When the screw shaft 22a returns to the return position, as illustrated in FIG. 3, the both ends of the first connection pin 23a can contact the anchor block (bracket) 14 supporting the electric actuator 20.

The second connection pin 23b is fitted on the swinging end 17a of the parking lever 17, and is disposed parallel to the first connection pin 23a. The second connection pin 23b is relatively rotatably fitted in a circular fitting hole 17a1 in the swinging end 17a at its intermediate portion, and is relatively rotatably fitted in circular second holes 23c2 in the connection plates 23c at its both ends. The second connection pin 23b has a larger diameter at the both ends than at the intermediate portion, thereby preventing falling-out.

Each of the connection plates 23c is rotatable with respect to the end of the screw shaft 22a in the circumferential direction of the first connection pin 23a at the first hole 23c1 where the connection plate is fitted in the first connection pin 23a, is rotatable with respect to the parking lever 17 in the circumferential direction of the second connection pin 23b at the second hole 23c2 where the connection plate is fitted in the second connection pin 23b, and connects the first connection pin 23a to the second connection pin 23b.

The motor control means (electric control unit) ECU has a function of stopping operation of the electric motor 21 when the rotational load reaches a set value during forward rotation of the electric motor 21, and a function of stopping operation of the electric motor 21 when the rotational load reaches a set value during backward rotation of the electric motor 21.

The motor control means (electric control unit) ECU is also connected to a parking brake switch (not illustrated) provided on a driver sheet of the car, the parking brake switch is activated to start forward rotation of the electric motor 21, and the parking brake switch is released to start backward rotation of the electric motor 21.

With the above configuration, in the parking lever 17 and the screw shaft 22a that are interconnected via the connection mechanism 23, the swinging face of the parking lever 17 is flush with the axis of the screw shaft 22a. Accordingly, in this embodiment, a driving force of the electric actuator 20 can be smoothly transmitted to the swinging end 17a of the parking lever 17.

In the electric parking brake device thus configured in this embodiment, when the parking brake switch is activated to start forward rotation of the electric motor 21, the screw shaft 22a of the electric actuator 20 axially moves from the return position toward the actuating position, and the parking lever 17 moves from the return position toward the actuating position. At this time, the parking lever 17 illustrated in FIG. 1 swings against the action of the return springs S1, S2, and S3 counterclockwise, thereby pressing the lining 13a of the right brake shoe 13 onto the brake drum not illustrated via the connecting rod 16 as well as pressing the lining 12a of the left brake shoe 12 onto the brake drum via the support shaft 18 to apply parking brakes. When the parking lever 17 moves to the actuating position, the rotational load due to forward rotation of the electric motor 21 (load caused by moving the brake shoes 12, 13 to the actuating position to press the linings 12a, 13a onto the brake drum) reaches the set value, stopping the operation of the electric motor 21 by use of the motor control means (electric control unit) ECU.

On the contrary, when the parking brake switch is released to start backward rotation of the electric motor 21, the screw shaft 22a of the electric actuator 20 axially moves from the actuating position toward the return position, and the parking lever 17 moves from the actuating position toward the return position due to the action of the return springs S1, S2, and S3. At this time, the parking lever 17 swings from the actuating position toward the return position clockwise. This swinging causes the left and right brake shoes 12, 13 to return to the return position, releasing parking brakes. When the parking lever 17 moves to the return position, the first connection pin 23a contacts the anchor block (bracket) 14, and the rotational load due to backward rotation of the electric motor 21 reaches the set value, stopping the operation of the electric motor 21 by use of the motor control means (electric control unit) ECU.

In this embodiment, the connection mechanism 23 that connects the end of the screw shaft 22a to the swinging end 17a of the parking lever 17 includes the first connection pin 23a, the second connection pin 23b, and the connection plates 23c, 23c, and the motion (swinging about the support shaft 18) of the parking lever 17 with respect to the linearly-moving screw shaft 22a is allowed by rotational motion about the first connection pin 23a and the second connection pin 23b of the connection plates 23c, 23c. Therefore, in this embodiment, problems associated with the connection structure of the conventional art (reduction of driving force, noise generation, stress concentration due to line contact, and the like) can be all resolved.

In this embodiment, the first holes 23c1 of the connection plates 23c each are formed of an elliptical hole extending in the moving direction of the connection plates 23c (lateral direction in the figures). Thus, size variation of components and movement of the connection plates 23c at service braking of the drum brake 10 (braking due to the operation of the wheel cylinder 15) can be absorbed by movement of the first connection pin 23a in the elliptical first holes 23c1.

In this embodiment, when the screw shaft 22a moves to the return position, the first connection pin 23a can contact the anchor block (bracket) 14 supporting the electric actuator 20. Thus, the first connection pin 23a contacts the anchor block (bracket) 14, thereby stopping the screw shaft 22a at the return position. Accordingly, the parking lever 17 connected to the end of the screw shaft 22a via the connection mechanism 23 can be also stopped to restrict unnecessary motion of the screw shaft 22a, the parking lever 17, and so on.

In the above embodiment, the first holes 23c1 of the connection plates 23c are elliptical and the second holes 23c2 of the connection plates 23c are circular. However, the first holes 23c1 of the connection plates 23c may be circular and the second holes 23c2 of the connection plates 23c may be elliptical. In the above embodiment, when the screw shaft 22a moves to the return position, the both ends of the first connection pin 23a can contact the anchor block (bracket) 14. However, when the screw shaft 22a moves to the return position, one end of the first connection pin 23a can contact the anchor block (bracket) 14.

In the above embodiment, the connection mechanism 23 that connects the end of the screw shaft 22a to the swinging end 17a of the parking lever 17 includes the first connection pin 23a, the second connection pin 23b, and the pair of connection plates 23c, 23c. However, for example, the end of the screw shaft 22a and the swinging end 17a of the parking lever 17 each may be yoke-shaped (bifurcated) to sandwich one connection plate 23c, such that the connection mechanism 23 includes the first connection pin 23a, the second connection pin 23b, and one connection plate 23c (the number of components is reduced).

In the above embodiment, the electric actuator 20 includes the electric motor 21, the conversion mechanism 22, and the connection mechanism 23. However, the electric actuator (20) only needs to include an electric motor capable of rotating forward and backward, a conversion mechanism capable of converting rotational motion of the electric motor into linear motion of a shaft member (screw shaft 22a), and a connection mechanism that connects an end of the shaft member to a swinging end of the parking lever (17). For example, the configuration of the electric motor (including the configuration of the motor control means (electric control unit) ECU) and the configuration of the conversion mechanism may be modified as appropriate.

The invention claimed is:

1. An electric parking brake device configured to move a parking lever in a drum brake from a return position to an actuating position by forward driving of an electric actuator, moving a brake shoe from the return position to the actuating position, and to move the parking lever from the actuating position to the return position by backward driving of the electric actuator, moving the brake shoe from the actuating position to the return position, wherein the electric actuator includes an electric motor capable of rotating forward and backward, a conversion mechanism capable of converting rotational motion of the electric motor into linear motion of a shaft member, and a connection mechanism that connects an end of the shaft member to a swinging end of the parking lever, and the connection mechanism includes a first connection pin that is fitted in an end of the shaft member, is orthogonal to the shaft member, and is disposed parallel to a support shaft of the parking lever, a second connection pin that is fitted in a swinging end of the parking lever and is disposed parallel to the first connection pin, and a connection member that is rotatable with respect to an end of the shaft member in a circumferential direction of the first connection pin at a first hole where the connection member is fitted on the first connection pin, is rotatable with respect to the parking lever in a circumferential direction of the second connection pin at a second hole where the connection member is fitted on the second connection pin, and connects the first connection pin to the second connection pin.

2. The electric parking brake device according to claim 1, wherein the first hole or the second hole of the connection member is an elliptical hole extending in the moving direction of the connection member.

3. The electric parking brake device according to claim 2, wherein
when the shaft member moves to the return position, the first connection pin can contact a bracket that supports the electric actuator.

4. The electric parking brake device according to claim 1, wherein
when the shaft member moves to the return position, the first connection pin can contact a bracket that supports the electric actuator.

* * * * *